United States Patent [19]
Schirle

[11] Patent Number: 5,898,545
[45] Date of Patent: Apr. 27, 1999

[54] HEAD LOAD/UNLOAD AND DISK AIRFLOW CONTROL APPARATUS

[75] Inventor: Neal Bertram Schirle, Morgan Hill, Calif.

[73] Assignee: International Business Machines Corporation, Armonk, N.Y.

[21] Appl. No.: 08/886,862

[22] Filed: Jul. 1, 1997

[51] Int. Cl.⁶ .............................. G11B 5/54; G11B 17/02
[52] U.S. Cl. .................. 360/105; 360/97.02; 360/97.03
[58] Field of Search ................................ 360/105, 97.02, 360/97.03

[56] References Cited

U.S. PATENT DOCUMENTS

| | | | |
|---|---|---|---|
| 3,846,835 | 11/1974 | Horovitz et al. | 360/98 |
| 5,140,578 | 8/1992 | Tohkairin | 369/75.2 |
| 5,189,574 | 2/1993 | Imamura et al. | 360/103 |
| 5,189,575 | 2/1993 | Onooka et al. | 360/105 |
| 5,483,399 | 1/1996 | Jeong et al. | 360/105 |
| 5,541,791 | 7/1996 | Yamasaki et al. | 360/105 |

FOREIGN PATENT DOCUMENTS

| | | | |
|---|---|---|---|
| 58-70459 | 4/1983 | Japan | 17/32 |
| 362377 | 3/1991 | Japan | 21/22 |

*Primary Examiner*—Robert S. Tupper
*Attorney, Agent, or Firm*—John H. Holcombe; Noreen A. Krall

[57] ABSTRACT

A head load/unload and airflow control apparatus for a disk stack is disclosed. Load/unload cams protrude into the OD of the disk stack for guiding the heads away from the corresponding disks during unloading and ramping the heads toward the corresponding disk during loading. Airflow vanes, each in the same plane and radially proximate to the outer edges of the corresponding disks are provided to limit airflow turbulence at the edge of the disks. Each airflow vane supports corresponding load/unload cams. A shroud supports the vanes and extends axially of the disk stack to limit airflow from the disks. The load/unload cams, airflow vanes and shroud may comprise a single element.

12 Claims, 4 Drawing Sheets

HEAD LOAD/UNLOAD AND DISK AIRFLOW CONTROL APPARATUS

TECHNICAL FIELD

This invention relates to disk file head load/unload apparatus, and, more particularly, to head load/unload apparatus which provides disk airflow control.

BACKGROUND OF THE INVENTION

Head load/unload has been used primarily for portable magnetic disk products which have been concerned about the potential for "head slap", which may be caused by external shock, e.g., when the computer for housing the disk drive or the disk drive is bumped or dropped. As the result of the external shock, the head slider momentarily lifts from the rest position on the disk and bounces back down on to the surface of the disk. The impact of the head slider on the disk can cause permanent deformation in localized areas of the disk where the slider edge or corner hits the disk, also referred to as "disk rings".

Portable disk drives are normally low capacity, low performance disk drives, having low disk spindle speeds (3600 to 4500 rpm), small disks (2.5" or 1.8" form factors) and a small number of disks (1 to 3). Such disk drives are not troubled by disk flutter due to airflow turbulence because of the lower spindle speeds and smaller diameter disks.

High end disk drives are having difficulty meeting the conflicting requirements of slider start/stop durability and stiction as fly heights necessarily are reduced to accommodate the need for increased data recording density. Head slider load/unload is one method for relieving these problems. Thus, head load/unload may become widely used in the industry to enable increased recording density with reliable start/stop.

High end disk drives are typically high capacity and high performance. Such drives comprise many large diameter disks (3.5" or 5.25" form factors) and operate at very high spindle speeds (7,200 to 10,000 rpm and higher in the future). "Disk flutter" becomes a significant problem at these high spindle speeds with large disks. Disk flutter is the term for aerodynamically excited disk vibration. Air turbulence in and around the disk stack is broad band in frequency content and excites the disk structural resonances.

Shrouding appears to reduce such air turbulence when located close to the outside diameter (OD) of the disk. However, such shrouding is in direct opposition to basic head load/unload cam designs. Typical load/unload cam designs need to be positioned near the disk OD and require an area free of any shrouding. The load/unload cams also protrude into the disk stack at the OD. Thus, not only does use of typical load/unload cams prevent maximum shrouding, the protrusion into the disk stack at the OD causes increased airflow disturbance that can cause increased disk flutter.

SUMMARY OF THE INVENTION

Disclosed is a head load/unload and airflow control apparatus for a disk stack with load/unload cams protruding into the outer radius (OD) of the disk stack for guiding the heads away from the corresponding disk during unloading and ramping the heads toward the corresponding disk during loading, airflow vanes, each in the same plane and radially proximate to the outer edge of the corresponding disk to limit airflow turbulence at the edge of the disks, each airflow vane supporting corresponding load/unload cams, and a shroud supporting the vanes and extending axially of the disk stack to limit airflow from the disks.

The load/unload cams, airflow vanes and shroud may comprise a single element, which may be molded, or may be formed from separate parts and assembled.

For a fuller understanding of the present invention, reference should be made to the following detailed description taken in conjunction with the accompanying drawings.

DETAILED DESCRIPTION OF THE INVENTION

Figure 1:
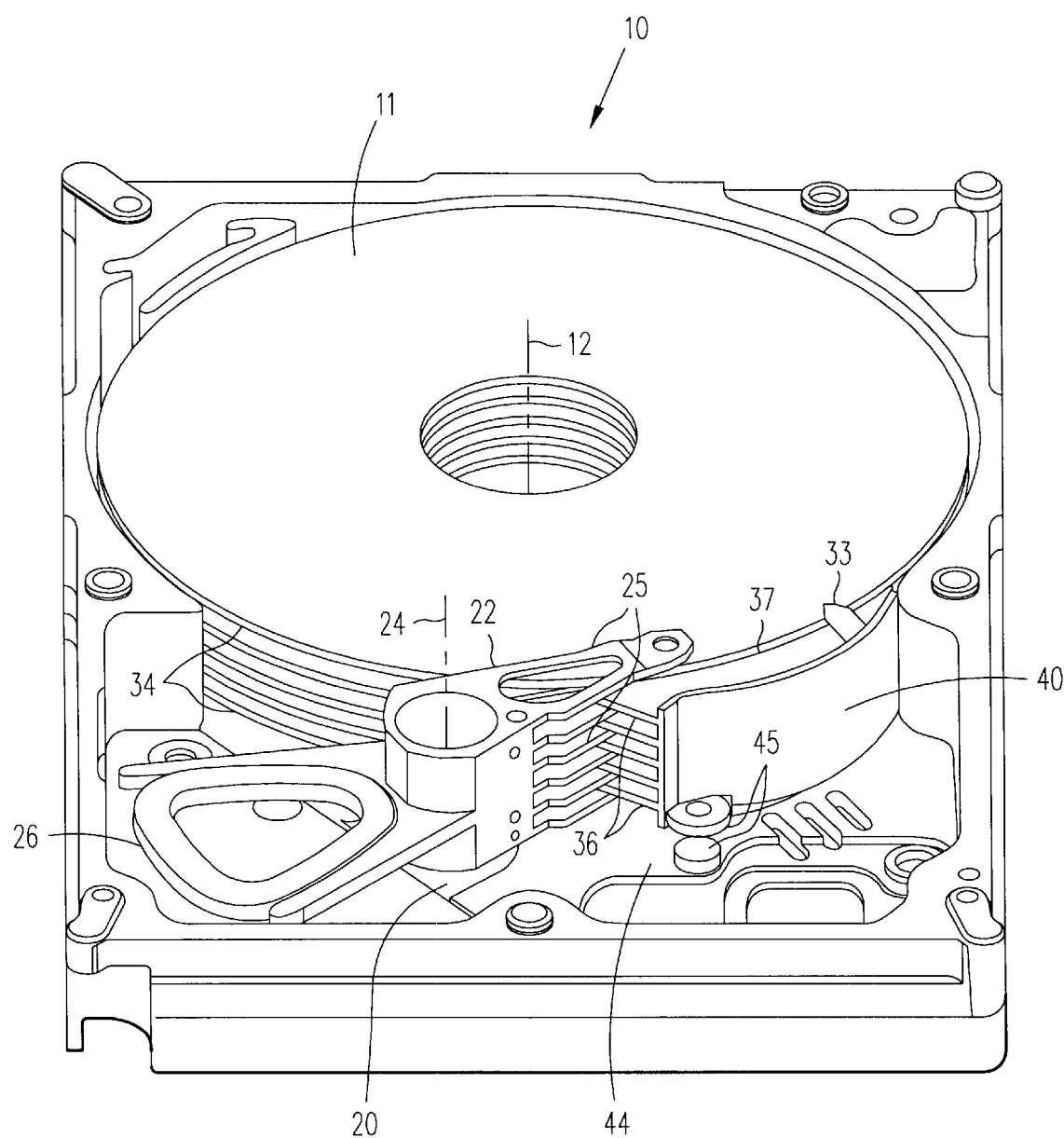
FIG. 1 is a perspective illustration of a disk file incorporating a head load/unload and airflow control apparatus of the present invention shown without the associated heads and suspensions.
Figure 2:
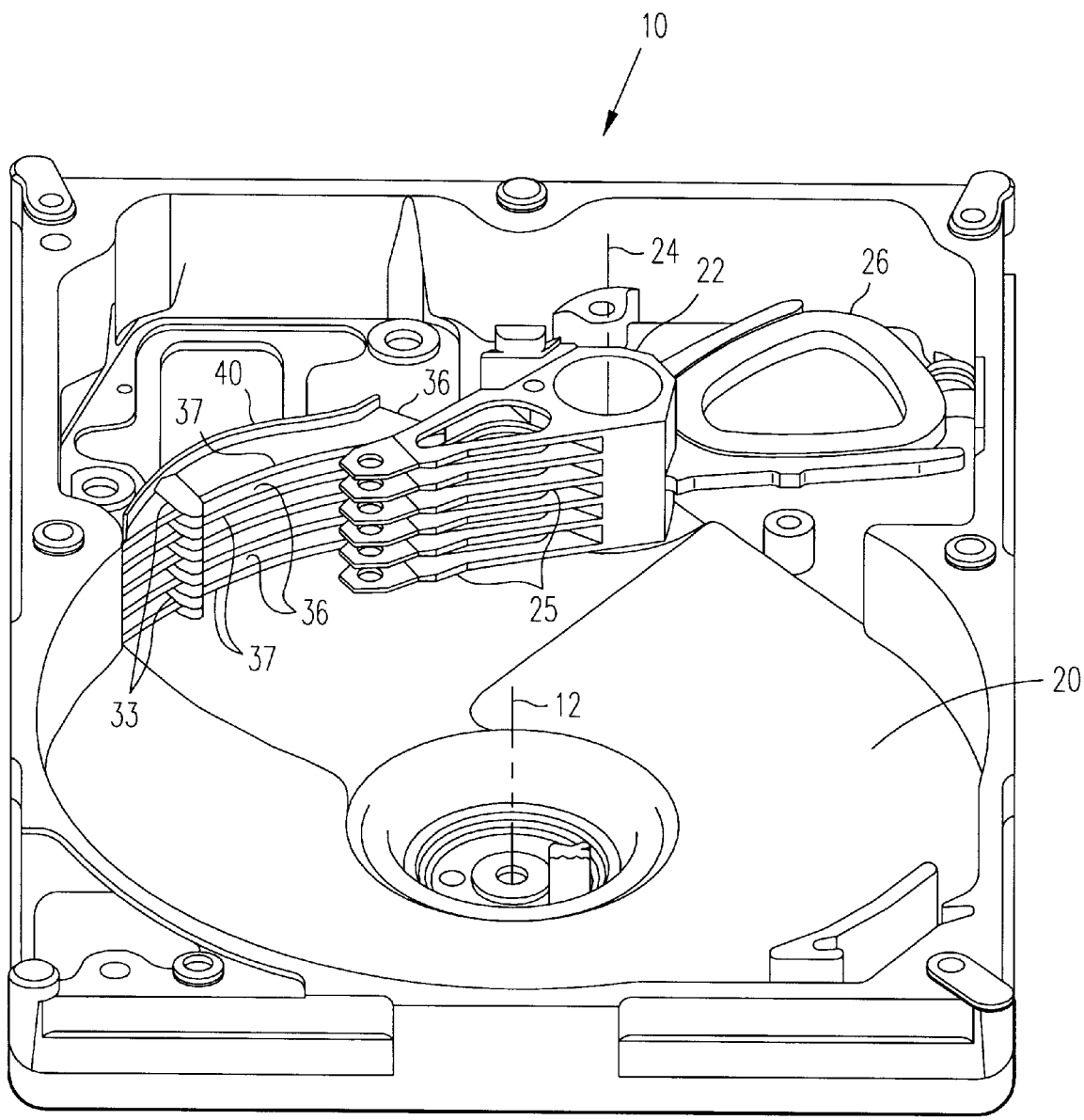
FIG. 2 is a perspective illustration of the disk file of FIG. 1, shown from the opposite side of disk file without the associated disks.

Referring to FIGS. 1 and 2, an embodiment of the present invention is illustrated in a magnetic disk file 10. The magnetic disk file includes a plurality of disks 11 supported on a common axis 12 by a spindle (not shown) for rotation about the common axis by a motor (not shown). Such spindles and motors are known to those of skill in the art.

The spindle for rotating disks 11 is mounted along axis 12 in a base plate 20. An actuator 22 is mounted on a pivot shaft (not shown) for rotation about a pivot axis 24. The pivot shaft is also known to those of skill in the art and is mounted on base plate 20 to fix pivot axis 24 parallel to disk common axis 12. A plurality of arms 25 are mounted on or formed on actuator 22 to form a comb structure of arms that are positioned between the disks 11. A voice coil 26 of a voice coil motor is mounted with actuator 22. A permanent magnet (not shown) is mounted on the drive and provides a magnetic field that is used by a current in voice coil 26 to rotate the actuator 22 about pivot axis 24.

Figure 3:
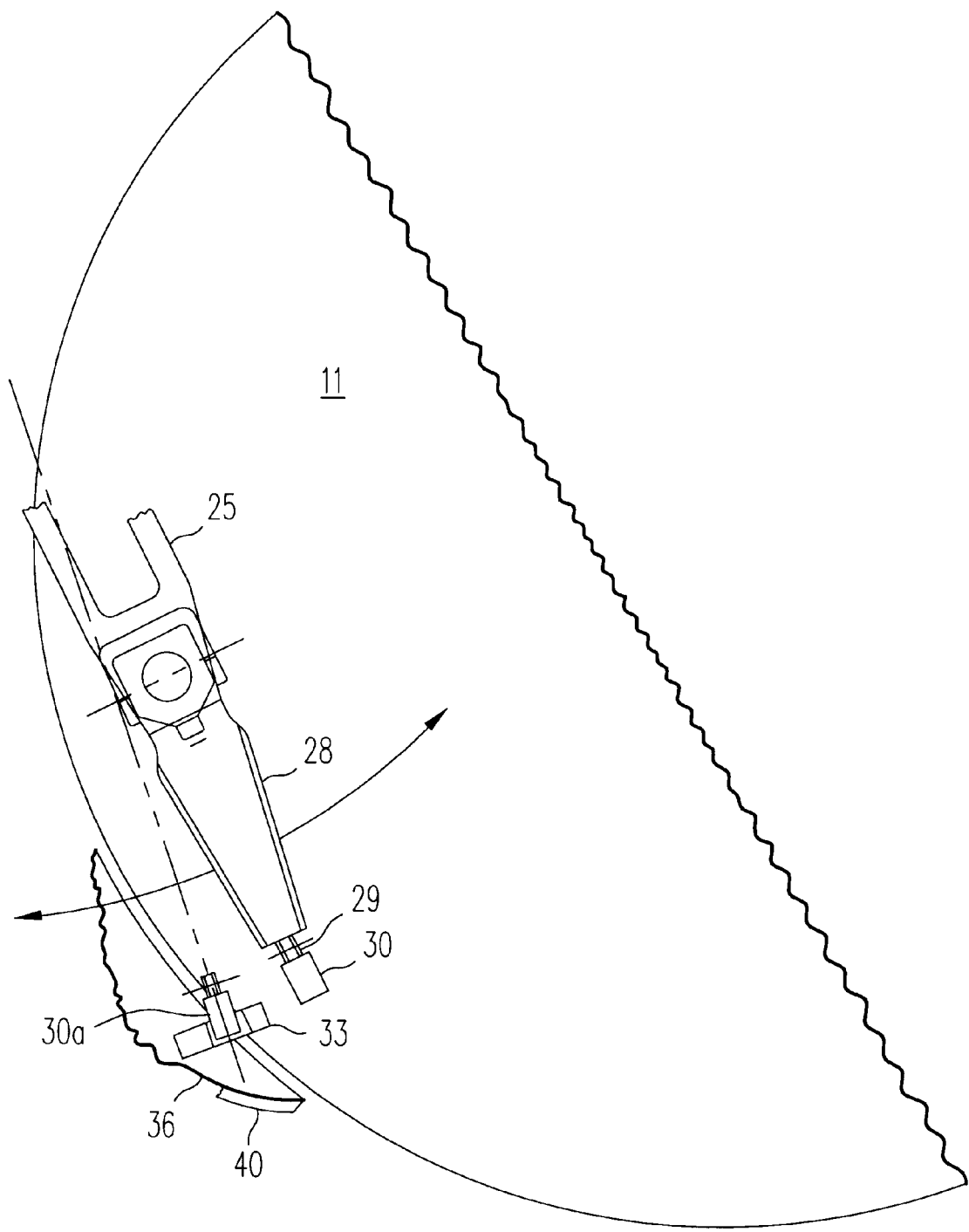
FIG. 3 is a top view illustration of a head and suspension and the head load/unload and airflow control apparatus of FIGS. 1 and 2.

Referring additionally to FIG. 3, a plurality of suspensions 28 and heads 29 are mounted on arms 25. The suspensions 28 are flat springs comprised of a load beam and flexure which support the heads 29 and urge the heads 29 toward the corresponding disks. The heads 29 comprise transducers formed on sliders which are designed to "fly" at very close spacing over the rotating disk, supported against the spring force of the load beams 28 by the flow of air moved by laminar flow with the moving disk past the slider. For the arms positioned between disks 11, two load beams 28 and corresponding heads 29 are provided and directed oppositely to support the corresponding heads against the surface of the disk 11 on either side of the arm 25. The arms 25 associated with the outer surfaces of the outer disks of the stack have only one load beam 28 and corresponding head 29 which flies over the corresponding outer surface of the outer disk 11. A tab or cam follower 30 is provided at the end of the suspension for load/unload, as will be described.

Still referring to FIGS. 1 and 2, voice coil motor 26 moves the arms 25 and associated load beams 28 in a generally radial direction of the disks 11 about pivot axis 24 between concentric recording tracks on recording surfaces of the disks. The transducers of the heads 29 may then read and/or write data on the recording tracks positioned under the heads.

As discussed above, it is becoming advantageous to unload the heads 29 away from the surface of the corresponding disks 11 when the disks 11 are stopped to prevent the head sliders from contacting the surface of the disks.

Figure 4:
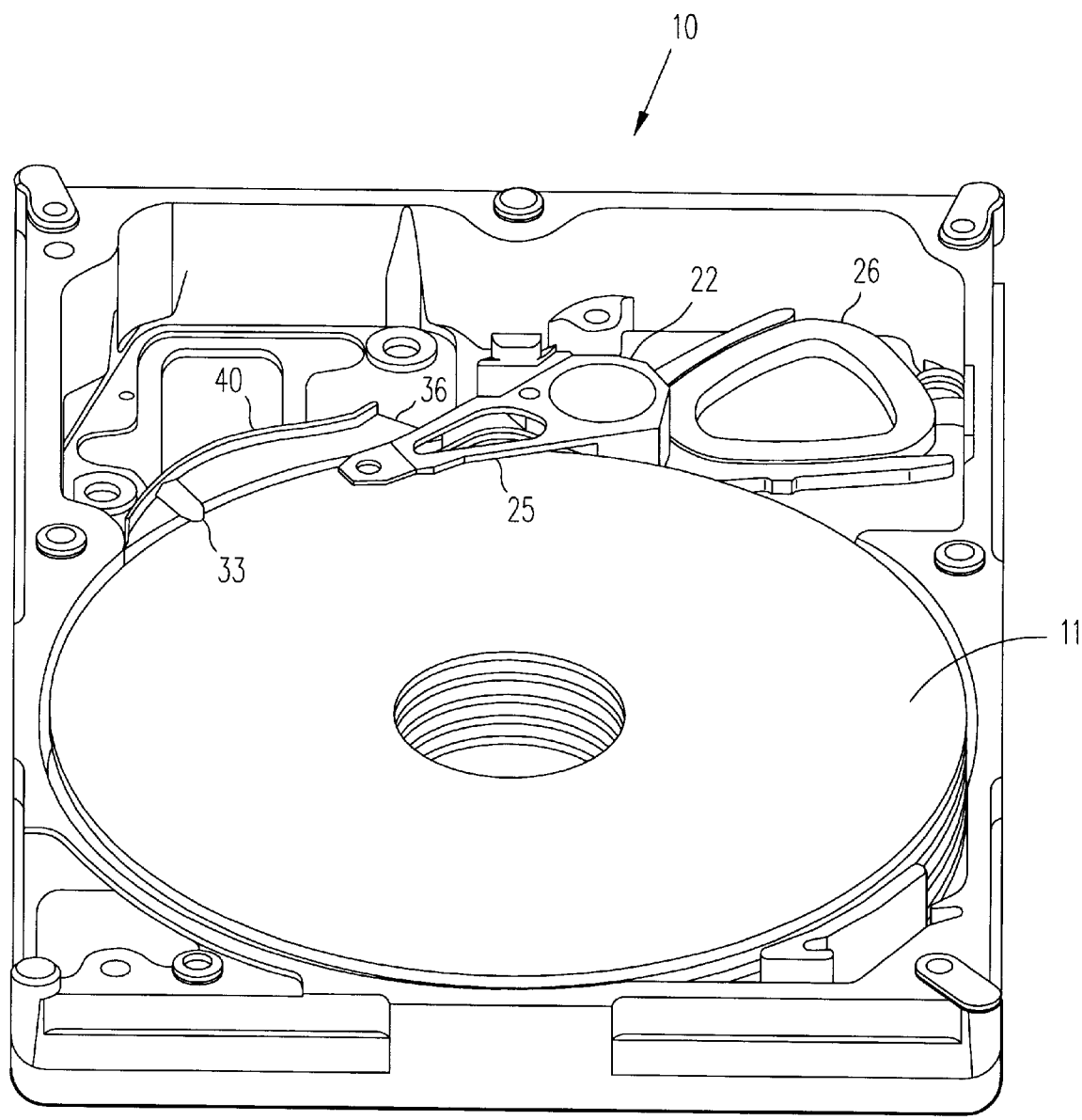
FIG. 4 is a perspective illustration of the disk file of FIG. 2, shown with the associated disks.

Note that in FIGS. 1, 2, and 4 the head suspension assemblies are not shown supported by the load/unload cams as they would be during the assembly process or in a power off state. Rather, for reasons of clarity and better viewing of the load/unload air flow control apparatus, the head suspensions are not shown in these figures.

Referring to FIGS. 1 through 3, in accordance with the present invention, load/unload cams 33 are positioned on each side of each disk 11, protruding within the OD of the disk 11 and providing a camming surface or ramp leading away from the corresponding surface of the corresponding disk. As actuator 22 rotates arms 25 and the mounted heads 29 and tabs 30 toward the OD of the disk, each tab, or cam follower, 30 engages the corresponding cam 33, the tab is moved up the corresponding ramp and moves the corresponding head away from the surface of the disk 11, as shown by position 30a in FIG. 3. Once the heads are safely stored at the load/unload cams 33, the disks 11 may be stopped.

After the disks 11 are restarted, the actuator 22 may be rotated to move the arms 25 and associated heads 29 inward toward the disk stack center. Tabs 30 then moves downward along the cams 33 and be loaded onto the surface of the corresponding disk 11.

As discussed above, disk flutter becomes a significant problem at high spindle speeds with large disks. Reduction in variation of the axial component of local air velocity vectors at the OD of the disks can reduce the aerodynamic excitation which leads to disk vibration. The axial component velocity can exist due to shedding vortices at the OD edge of the disks. As air "sheds" off the surfaces of the spinning disks 11 at the OD edges 34 (driven out radially by centrifugal force), vortices occur at the edge of the disk. Vortices are localized patterns of air flow with a spinning motion. Viewing a disk 11 at an edge 34 from the perspective of a radial cross section, with the OD disk surface to the right, there are counterclockwise spinning vortices off the upper edge and clockwise spinning vortices off the lower edge, where the axes of rotation are respectively toward and away from the viewer.

A set of airflow vanes 36 are provided in accordance with the present invention which are each coplanar with a corresponding disk 11, each having an edge 37 which has a radius of curvature equal to the disk OD at edge 34 plus a nominal clearance. The airflow vanes 36 at the close spacing from disk edges 34 of the present invention reduces the vortices and the aerodynamic excitation therefrom and therefore reduces disk flutter.

As an example, the airflow vane nominal clearance between airflow vane edge 37 and disk edge 34 is in the order of 25 to 100 microns.

The cams 33 may be mounted on the corresponding airflow vanes 36. In a preferred embodiment, the cams 33 may be formed integrally with vanes 36, for example, by casting as a single molded part.

Referring to FIGS. 1, 2 and 4, in accordance with an embodiment of the present invention, a shroud 40 is provided to achieve additional airflow control. The shroud 40 is arranged to extend axially of the disks 11 and to close off the side of airflow vanes 36 away from the disks 11 and thereby further reduce air turbulence.

The cams 33 and airflow vanes 36 may be mounted on shroud 40. In a preferred embodiment, the cams 33 and airflow vanes 36 may be formed integrally with shroud 40. For example, they may be cast as a single molded part with the pull direction of the die in the plane of the airflow vanes.

In addition to reduction of the airflow turbulence and therefore disk flutter, the vanes and shrouding of the present invention may also reduce the viscous dissipation losses, which is the energy loss that occurs in mixing or turbulence. Thus, the disks may be rotated at high speeds with less power consumption.

The shroud 40 and supported airflow vanes 36 and cams 33 are precisely mounted on base plate 20 in both the axial and radial directions with respect to the stack of disks 11. The vanes 36 are precisely positioned in the axial direction so as to be coplanar with the corresponding disks 11 and precisely positioned radially so that the edges 37 of the airflow vanes are in close proximity to the edges 34 of the disks 11. The cams 33 are precisely positioned in the axial direction so as to be closely adjacent to the corresponding surface of the disk 11 and precisely positioned radially so as to protrude into the stack of disks 11 the correct distance.

Referring to FIG. 1, shroud 40 and supported airflow vanes 36 and cams 33 may be precisely machined to the correct axial height and precisely mounted on base plate 20 at the correct radial position and fixed in position by screws or by cementing. Alternatively, shroud 40 may be mounted on, or formed in common with, base 44, and base 44 then precisely positioned with respect to the disks 11. Base 44 may be precisely positioned axially by means of shims, and precisely positioned radially by shifting with respect to base plate 20 and fixed by means of screws 45.

Merger of the disk file components may be accomplished in various ways. Actuator 22 with the heads and suspensions ("HGA" for head gimbal assembly) merged with the cam, vane, shroud unit and installed in the park position on base plate 20 and then the disks 11 installed. Alternatively, actuator 22 with the HGAs merged on the cam, vane shroud unit and held in proper relative position with tooling may be installed as a group onto the base plate 20 when the disks 11 are in place.

The arrangement of the present invention may be used with a single disk or with a stack of disks and will reduce air turbulence at the edge of each disk.

While the preferred embodiments of the present invention have been illustrated in detail, it should be apparent that modifications and adaptations to those embodiments may occur to one skilled in the art without departing from the scope of the present invention as set forth in the following claims.

I claim:

1. An airflow and load/unload apparatus for use with a rotatable disk, said disk being planar and having an outer edge at an OD, comprising:

load/unload cams positioned on each side of said disk within said OD of and near said outer edge of said disk;

an airflow vane in the same plane as said disk and having an inner edge toward said disk radially proximate to said outer edge of said disk, said airflow vane supporting said load/unload cams, said airflow vane inner edge having a radius of curvature equal to said OD of said disk plus a nominal clearance; and a shroud positioned at an outer side of said airflow vane away from said inner edge, supporting said airflow vane thereat, and extending axially of said disk to close off said outer side of said airflow vane away from said disk to limit airflow from said disk.

2. The airflow and load/unload apparatus of claim 1, wherein:

said airflow vane nominal clearance is in the order of 25 to 100 microns.

3. The airflow and load/unload apparatus of claim 1, wherein:

said load/unload cams, said airflow vane and said shroud comprise a single element.

4. An airflow and load/unload apparatus for use with a plurality of planar, parallel, coaxial, rotatable disks, each said disk having an outer edge at an OD, comprising:

load/unload cams positioned on each side of each said disk within said OD of and near said outer edge of a corresponding said disk;

airflow vanes, each in the same plane as a corresponding one of said disks, and having an inner edge toward said disk radially proximate to said outer edge of said corresponding disk, each said airflow vane supporting corresponding said load/unload cams, each said airflow vane inner edge having a radius of curvature equal to said OD of said corresponding disk plus a nominal clearance; and a shroud positioned at an outer side of said airflow vanes away from said inner edge, supporting said airflow vanes thereat, and extending axially of said disk to close off said outer side of said airflow vanes away from said disks to limit airflow from said disks.

5. The airflow and load/unload apparatus of claim 4, wherein:

said airflow vane nominal clearance is in the order of 25 to 100 microns.

6. The airflow and load/unload apparatus of claim 4, wherein:

said load/unload cams, said airflow vanes and said shroud comprise a single element.

7. A head load/unload and airflow control apparatus for use with at least one planar, parallel, coaxial, rotatable disk, each said disk having an outer edge at an OD, comprising:

heads for reading and/or writing on opposite sides of each said disk;

suspensions for supporting said heads and for urging each said head toward a corresponding said disk and having load/unload tabs;

an actuator for moving said suspensions and thereby said heads in a substantially radial direction of said disks during loading or unloading of said heads;

load/unload cams positioned on each side of each said disk within said OD of and near said outer edge of a corresponding said disk for guiding said suspension load/unload tabs and thereby said heads away from said corresponding disk during unloading and ramping said suspension load/unload tabs and thereby said heads toward said corresponding disk during loading;

airflow vanes, each in the same plane as a corresponding one of said disks, and having an inner edge toward said disk radially proximate to said outer edge of said corresponding disk, each said airflow vane supporting corresponding said load/unload cams, each said airflow vane inner edge having a radius of curvature equal to said OD of said corresponding disk plus a nominal clearance; and a shroud positioned at an outer side of said airflow vanes away from said inner edge, supporting said airflow vanes thereat, and extending axially of said disk to close off said outer side of said airflow vanes away from said disks to limit airflow from said disks.

8. The head load/unload and airflow control apparatus of claim 7, wherein:

said airflow vane nominal clearance is in the order of 25 to 100 microns.

9. The head load/unload and airflow control apparatus of claim 7, wherein:

said load/unload cams, said airflow vanes and said shroud comprise a single element.

10. A magnetic disk file comprising:

at least one planar, parallel, coaxial, disk, each said disk having an outer edge at an OD;

a motor for rotating said plurality of disks about a central axis;

heads for reading and/or writing on opposite sides of said disks;

suspensions for supporting said heads and for urging each said head toward said disk and having load/unload tabs;

an actuator for moving said suspensions and thereby said heads in a substantially radial direction of said disk during loading or unloading of said head;

load/unload cams positioned on each side of said disk within said OD of and near said outer edge of said disk for guiding said suspension load/unload tabs and thereby said heads away from said disk during unloading and ramping said suspension load/unload tabs and thereby said heads toward said disk during loading;

an airflow vane in the same plane as each said disk and having an inner edge toward said disk radially proximate to said outer edge of said disk, said airflow vane supporting said load/unload cams, each said airflow vane inner edge having a radius of curvature equal to said OD of said corresponding disk plus a nominal clearance; and a shroud positioned at an outer side of said airflow vanes away from said inner edge, supporting said airflow vanes thereat, and extending axially of said disk to close off said outer side of said airflow vanes away from said disks to limit airflow from said disks.

11. The magnetic disk file of claim 10, wherein:

said airflow vane nominal clearance is in the order of 25 to 100 microns.

12. The magnetic disk file of claim 10, wherein:

said load/unload cams, said airflow vanes and said shroud comprise a single element.

* * * * *